March 20, 1928.
S. CARLSON
SHOVEL OPERATING MECHANISM
Original Filed Feb. 12, 1926   2 Sheets-Sheet 1
1,663,292
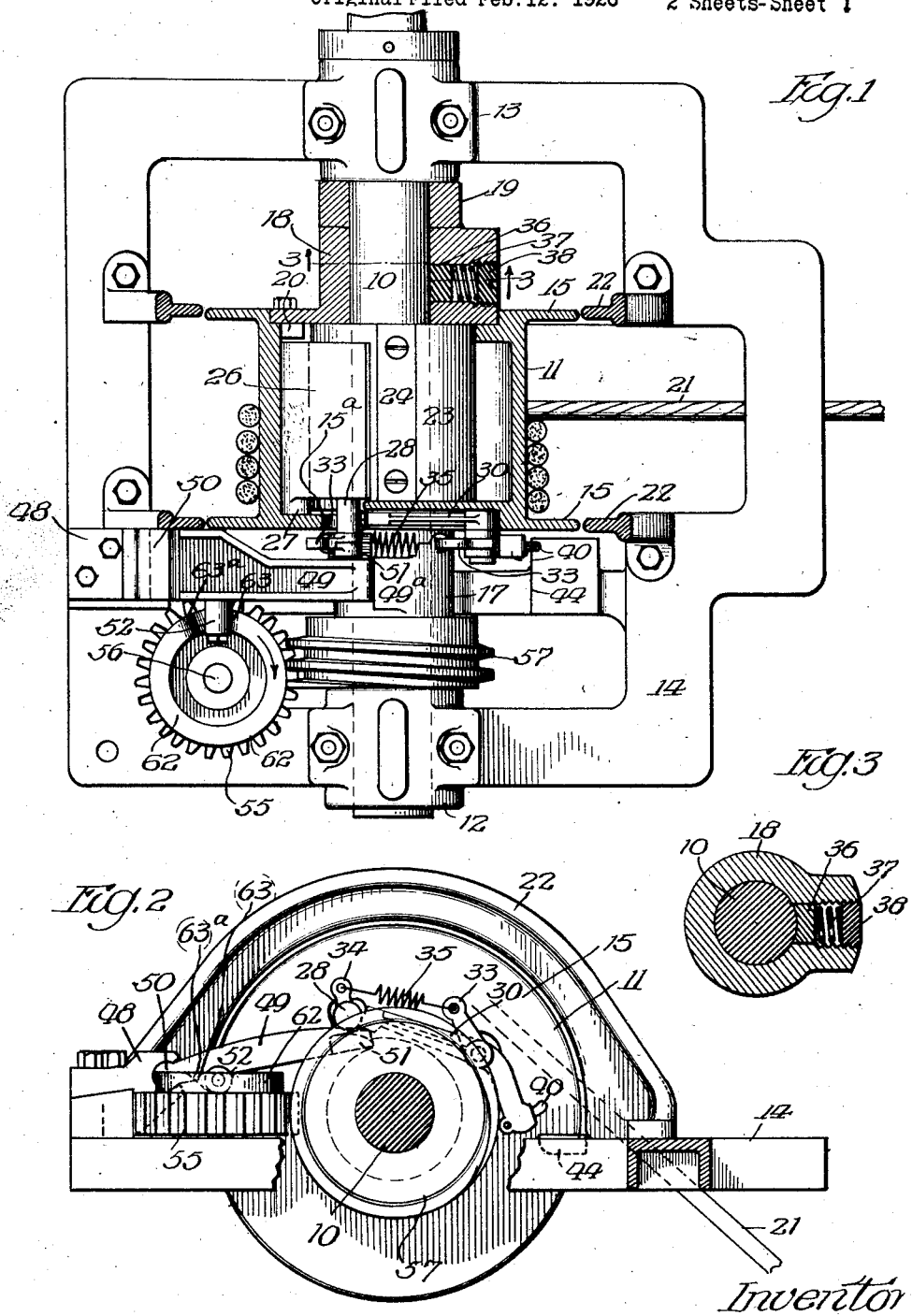

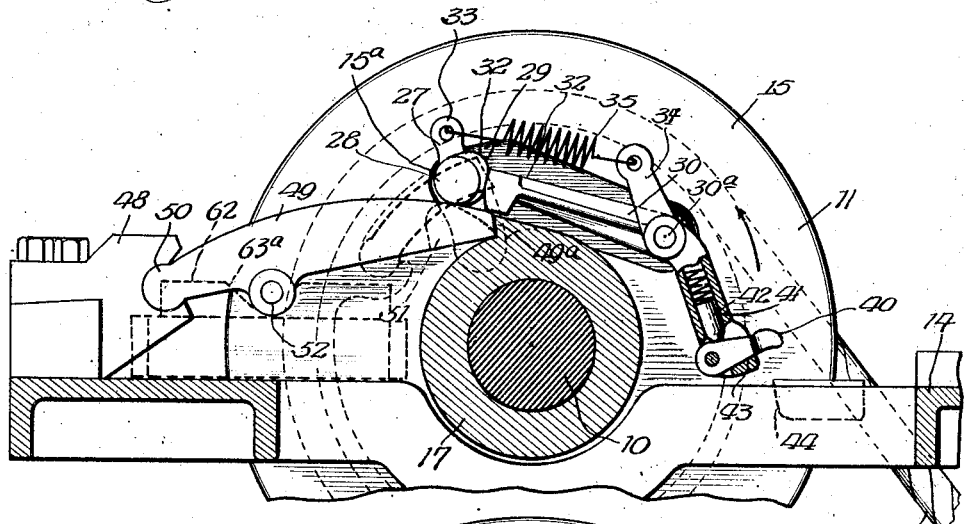
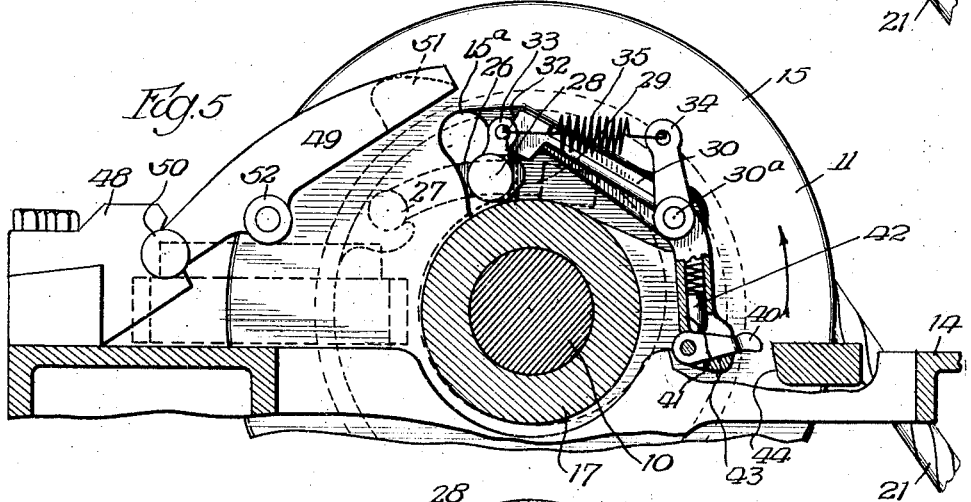
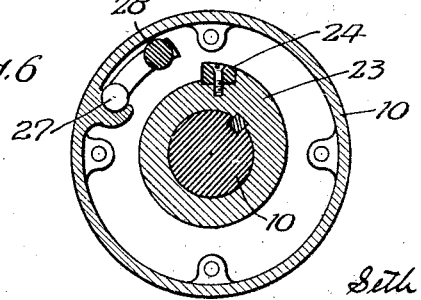

Patented Mar. 20, 1928.

1,663,292

UNITED STATES PATENT OFFICE.

SETH CARLSON, OF CHICAGO, ILLINOIS, ASSIGNOR TO WELLER MANUFACTURING COMPANY, OF CHICAGO, ILLINOIS, A CORPORATION OF ILLINOIS.

SHOVEL-OPERATING MECHANISM.

Application filed February 12, 1926, Serial No. 87,763. Renewed February 9, 1928.

The invention relates to power-driven mechanism for operating shovels and similar devices, such as those used for unloading grain from cars or vessels.

One object of the invention is to improve the mechanism set forth in Letters Patent No. 946,621 dated January 18, 1910. Another object of the invention is to provide mechanism for imparting the initial forward movement of the drum to couple it to the drive-shaft, which is operated by power taken from the drive-shaft, so as to dispense with the use of a weight for this purpose, such as is exemplified in said patent. Another object of the invention is to simplify the mechanism for automatically uncoupling the drum from the drive-shaft when the shovel to be operated has reached the point of delivery.

The invention consists in the several novel features hereinafter set forth and more particularly defined by claims at the conclusion hereof.

In the drawings: Fig. 1 is a plan, parts being shown in section, of mechanism embodying the invention. Fig. 2 is an end elevation. Fig. 3 is a detail section on line 3—3 of Fig. 1. Fig. 4 is a view of the clutch tripping mechanism in position assumed while the drum is being operated by power to move the shovel and its load forwardly. Fig. 5 is a similar view showing the parts in position assumed when the drum is uncoupled from its shaft and free to be rotated to permit the shovel to be taken to the point of loading. Fig. 6 is a section, showing the clutch between the drive shaft and the drum on which the cable is wound.

The invention is exemplified in mechanism comprising a drive-shaft 10, which is constantly driven by power suitably applied thereto, usually a belt pulley at one end thereof, and a winding drum 11, which constitutes the driven member. Shaft 10 is journalled in bearings 12 and 13 on a suitable supporting frame 14. The drum 11 is rotatable on and relatively to the shaft 10. The frame 14 is usually mounted in an elevated position. The drum 11 is provided with side flanges 15 to confine a winding rope 21 thereon, and is provided at one end with an integral hub 17, and its other end is secured by bolts 20 to a spearately formed hub 18. A split collar 19 is detachably connected to the shaft 10 to hold the drum longitudinally in the frame, and so that, when the collar is detached, the drum can be slid endwise upon the shaft to provide access to the parts at the other end of the drum. Rope 21 is wound on the drum 11 and has one of its ends secured thereto, and its other end is connected to the scoop or shovel which is to be operated. A pair of semi-circular guards 22 are fixed to frame 14 and extend over flanges 15 and 16 to prevent displacement of the rope from the drum. The drive-shaft 10 is continuously driven in the direction of the arrow in Fig. 4.

The drum is adapted to be driven from the drive-shaft by a clutch consisting of a cam-shaped sleeve 23 with a hardened insert or wear strip 24 secured thereon and a dog 26 which is provided with pintles 27, whereby it is pivotally mounted in the drum, its free end being adapted to swing in front of the tooth or strip 24 of the driven clutch-member.

At one end and near its free edge, the dog 26 is provided with a pin 28 that projects laterally through an opening 15$^a$ in the drum-head 17. A latch 30, for dog 26, is disposed within a recess 31 in the outer face of drum head 17, and is pivotally mounted on said head by a stud 30$^a$. A cam-shaped head 32 is formed at the free end of latch 30 to cooperate with a cam-shaped shoulder 29 on stud 28 to hold the clutch-dog in disengaged position. Stud 28 of the dog and the hub of latch 30 are provided with projecting arms 33 and 34 that are connected by a contractile coil spring 35, which tends to throw the latch 30 inwardly to hold the clutch dog in disengaged position, and also to throw the clutch dog when the latch is tripped into engagement with the clutch member. When latch 33 is tripped by outward movement, spring 35 throws the clutch-dog 26 into position to be driven by the driven clutch member 23. The cam-head 32 on the latch and the cam shoulder 29 on the clutch-dog are so shaped that when the dog has been tripped to its operative position, the latch 30 will be held in its tripped position by the engagement of shoulder 29 with head 32, and the clutch dog will be held by spring 35 against the face of clutch-member 23 until the tooth or bar 24 in its rotation engages the clutch-dog to drive the drum in forward direction. Latch 30 holds the clutch dog 26 in its disengaged position during the reverse or unwinding movement of the drum, which occurs while the operator drags back the empty scoop attached to the free end of rope 21. When the operator has brought the scoop to the point of loading, he will thrust the scoop in forward direction into the pile of material, thus producing a slack in the rope 21 and suitable means are provided for automatically imparting an initial movement to the drum in forward direction when this slack is produced, to effect the coupling of the clutch-members, so that the rope will be wound up by power to move the scoop and its load to the desired point of discharge.

The means for imparting initial forward movement to the drum comprises a fibre shoe or block 36 which is mounted in a radial socket in the drum hub 18, and is pressed to frictionally engage the periphery of shaft 10 by a coil spring 37 held in said socket by a plug 38. This device serves as a means for imparting initial forward movement to the drum, which is operated by friction derived from the power-shaft 10, so that the necessity of providing a drum cable and weight, as exemplified in Patent No. 946,621, is obviated. The friction between the shoe 36 and shaft 10 will suffice, when the slack is produced in the rope 21, to rotate the drum in forward direction until the clutch-members have been brought into positive driving relation. This device exemplifies means operated by power derived from the driving member or shaft for imparting the initial movement to the drum in forward direction to effect the tripping of the clutch, to render the drum operative to wind up the cable and pull the load to the desired unloading point.

A one-way trip 40 is pivotally mounted in a recess in one end of an arm 41 that projects from the hub of latch 30. A spring-pressed plunger 42, slidably held in a socket in arm 41, normally holds the trip against a stop 43 at the outer end of said arm. A fixed abutment 44 is arranged in the path of rotation of the trip 40. During the reverse or unwinding movement of the drum, the trip 40 will pass idly inside of abutment 44. During the initial forward rotation of the drum, effected by the friction device 36, the trip 40 will be held against oscillation, so that when it encounters abutment 44, it will be forced inwardly toward shaft 10 to swing latch 30 outwardly from the shaft to release the clutch-dog 26. As soon as released from the latch, spring 35 will shift the clutch-dog into engagement with the clutch-member 23 to cause the drum to be rotated in its forward direction to wind up the rope 21 and pull the load thereon. The cam-head 32 on the latch and the cam-shoulder 29 on the clutch-dog will then cooperate to hold the latch in its operative position, and the trip 40 will clear the abutment 44 in its rotation.

The forward movement of the drum and scoop to automatically disconnect the drum from the driving shaft, when the load has been brought to the desired unloading point, comprises a stop dog 49 which is provided with a pivot 50, the axis of which is horizontal to permit the dog to swing vertically to and from the axis of shaft 10. This pivot is held in a suitable bearing block 48, which is bolted to the frame 14. The inner end of the stop dog is provided with an offset cam 51, which is adapted to extend into the path of rotation of the stud 28 on the clutch-dog to move it away from the axis of shaft 10, to disengage the dog from the clutch member on the drive shaft. The free end of the stop dog is adapted to engage an abutment 49ª on the hub 17 of the drum to positively arrest the movement of the drum after the clutch members have been disengaged. The stop dog is provided with a roller 52, which is adapted to bear on the top of a circular flange 62, which is provided with a recess 63. A worm gear 55, journalled upon a vertical stud 56, on the frame 14 is engaged by a worm 57 which is fixed upon the outer end of the hub 17 of the drum, so that the gear 55 will be driven in opposite directions with the drum. The flange 62 is adapted to hold the stop dog 49 in its inoperative position, and when the roller 52 drops into the notch 63, the stop dog will fall by gravity into position to engage stud 28 and disengage the clutch dog from the clutch-member on the drive shaft. One side 63ª is inclined so the stop dog 49, during the initial reverse movement of the drum, will be lifted onto the top of flange 62.

In operation, the several parts of the power mechanism will be in position shown in Fig. 2, when the scoop is at the unloading point, the clutch-dog 26 being at such time disengaged from the clutch member on the drive shaft, the roller 52 of the stop-dog 49 resting in notch 63 at such time, so that the clutch-dog will be locked in its inoperative position by the latch arm 30. The operator then carries the empty scoop back to the loading point and unwinds the rope 21 while the drum rotates in reverse direction. This reverse movement of the drum through worm 57 and worm-gear 55, will rotate the flange 62 to lift the roller 52 onto said flange, so that the stop dog 49 will be shifted into its inoperative position. The extent of the movement of the notch 63 away from roller 52 is determined by the extent of movement of the scoop between its unloading and loading positions. During this unwinding of the rope, the clutch dog will remain in its inoperative position. At any desired point, the operator may set the power mechanism into operation by thrusting the scoop forwardly to give slack to the rope 21 to permit the friction shoe 36 to rotate the drum in forward direction. This initial forward movement of the drum will continue until the trip 40 strikes abutment 44 and then the trip will be forced inwardly to rock the latch arm 30 outwardly and release the clutch-dog 26. Thereupon, said dog will be operated by spring 35 into engagement with the clutch-member on the drive shaft 10, to wind up the rope 21 and draw the load to the unloading point. At that time, the roller 52 will drop into notch 63 and release the stop-dog 49, so that its cam 51 will engage the stud 28 on the clutch-dog and disengage the latter from the clutch-member on the shaft 10. When this occurs, the latch-arm 30 will also be operated by spring 35 into position to lock the clutch dog in its inoperative position.

The invention exemplifies improved power mechanism for operating cables to draw loads, in which the initial forward movement necessary to trip the clutch-dog is imparted to the drum by a device which is driven by power from the driving member or shaft, so that the use of a weight and cable, as exemplified in Patent No. 946,621, will be avoided. The invention also exemplifies an improved stop dog and controlling mechanism in which the dog is pivoted to swing vertically or transversely to the axis of the drum, so that a device for positively shifting the stop dog laterally is avoided.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In power driven mechanism of the character described, the combination with driving and driven members, of cooperating clutch members connected respectively to said driving and driven members, a latch for holding said clutch-members disengaged, a stop-dog for disengaging one of said clutch-members from the other at the end of the forward movement of said driven member, and means operated by power derived from the driving member, to impart initial movement to said driven member in forward direction for tripping said latch to engage said clutch-members.

2. In power mechanism of the character described, the combination with driving and driven members, of cooperating clutch members connected respectively to said driving and driven members, a latch for holding said clutch-members disengaged, a stop-dog for positively arresting one of said clutch members and for disengaging it from the other clutch member at the end of the forward movement of said driven member, and a friction device driven by said driven member, to impart initial movement to said driven member in forward direction for tripping said latch to engage said clutch-members.

3. In power mechanism of the character described, the combination with a driving shaft and a driven drum, of cooperating clutch members connected respectively to said shaft and drum, a latch for holding said clutch-members disengaged, a stop dog for positively arresting one of said clutch members and for disengaging it from the other clutch-member at the end of the forward movement of said drum, and a friction device between the drum and the shaft to impart initial movement of said drum in forward direction for tripping said latch to engage said clutch-members.

4. In power mechanism of the character described, the combination with a driving shaft and a driven drum, of cooperating clutch members connected respectively to said shaft and drum, a latch for holding said clutch-members disengaged, a stop dog for positively arresting one of said clutch-members and for disengaging it from the other clutch-member at the end of the forward movement of said drum, and a friction device comprising a shoe slidably held in the hub of the drum, a spring in the hub, and a screw for holding the spring for imparting the initial forward movement to the drum to trip the latch and disengage said members.

5. In power mechanism of the character described, the combination with a drive-shaft and a winding drum, of clutch-members, one of which is movable into and out of engagement with the other and connected respectively to the shaft and the drum, a latch for holding said movable clutch member in disengaged position during the reverse movement of the drum, means for imparting an initial movement to the drum in forward direction, means controlled by such initial movement of the drum for tripping said latch to engage the clutch members, a stop dog pivoted to swing transversely of the axis of the drum, and means for shifting said dog into and out of the rotary path of movement of a part on said movable clutch member to disengage the same at the end of the forward movement of the drum.

6. In power mechanism of the character described, the combination with a drive-shaft and a winding drum, of clutch-members, one of which is movable into and out of engagement with the other and connected respectively to the shaft and the drum, a latch for holding said movable clutch member in disengaged position during the reverse movement of the drum, means for imparting an initial movement to the drum in forward direction, means controlled by such initial movement of the drum for tripping said latch to engage the clutch members, a stop dog pivoted to swing transversely of the axis of the drum, means for shifting said dog into and out of the rotary path of movement of a part on said clutch-member to arrest and disengage the same at the end of the forward movement of the drum, and an abutment rigid on the drum to engage the dog and positively arrest the drum against forward movement.

7. In power mechanism of the character described, the combination with a drive shaft, and a winding drum, of cooperating clutch members, one of which is spring pressed toward the other, said clutch-members being connected respectively to said shaft and said drum, a latch for holding said spring pressed clutch-member in disengaged position during the reverse movement of the drum, means for imparting an initial forward movement of the drum, a one-way trip and a cooperating abutment for releasing said latch on such initial movement of the drum, a stop dog pivoted to swing in a plane transverse to the axis of the shaft for disengaging the spring pressed clutch member at the end of the forward movement of the drum, and operating mechanism for said stop-dog driven from the drum.

8. In power mechanism of the character described, the combination with a drive-shaft, and a winding drum, of cooperating clutch members, one of which is spring pressed toward the other, said clutch-members being connected respectively to said shaft and said drum, a latch for holding said spring-pressed clutch member in disengaged position during the reverse movement of the drum, means for imparting an initial forward movement of the drum, a one-way trip and a cooperating abutment for releasing said latch on such initial movement of the drum, a stop-dog pivoted to swing in a plane transverse to the axis of the shaft for disengaging the spring-pressed clutch member at the end of the forward movement of the drum, an abutment rigid on the drum to engage the dog and arrest the drum against forward movement, and operating mechanism for said stop-dog driven from the drum, comprising a horizontally rotating wheel with a notched flange on the top of which the dog rides.

Signed at Chicago, Illinois, this 14th day of July, 1925.

SETH CARLSON.